F. M. Sofge.
Horse Power.
Nº 22,680.  Patented Jan. 18, 1859.
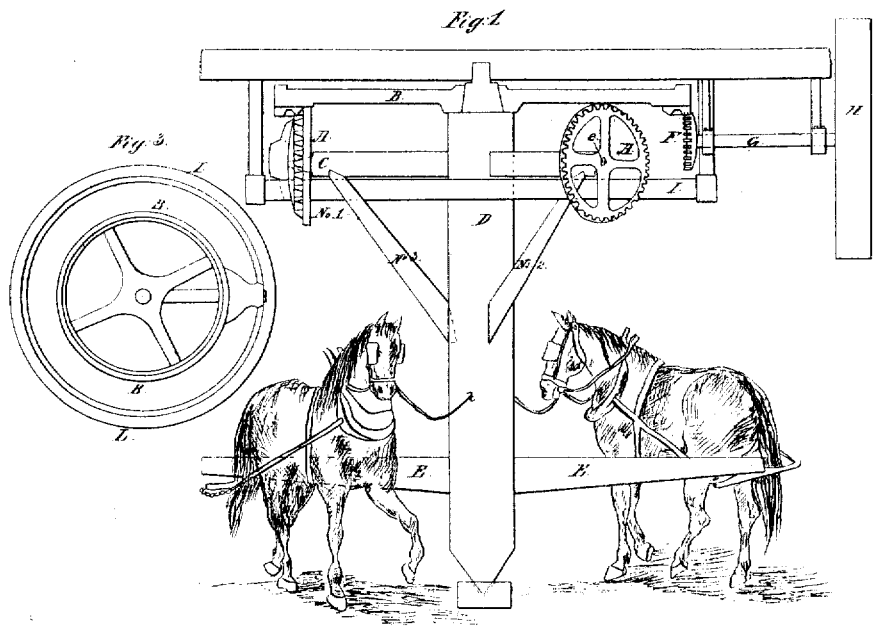
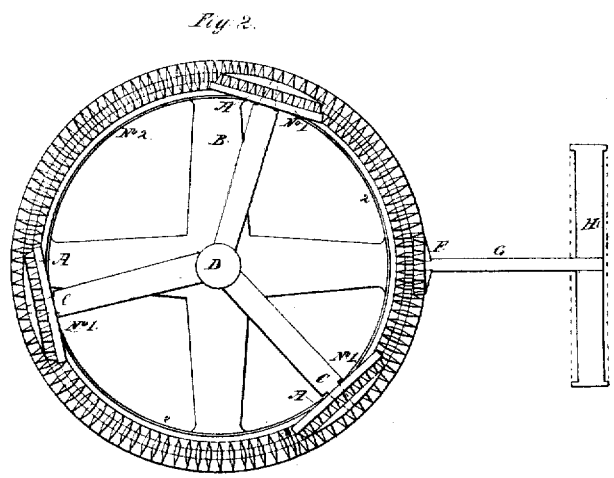
Witnesses:  Inventor:

UNITED STATES PATENT OFFICE.

FERDINAND M. SOFGE, OF COLUMBUS, GEORGIA.

HORSE-POWER.

Specification of Letters Patent No. 22,680, dated January 18, 1859.

*To all whom it may concern:*

Be it known that I, FERDINAND M. SOFGE, of the city of Columbus, Muscogee county, State of Georgia, have invented a new and Improved Horse-Power; and I do hereby declare that the following is a full and exact description of the construction and operation of the same, reference being had to the annexed drawings, which make part of this specification.

Figure 1 is a base plan; Fig. 2, transverse section. Fig. 3, is a modification of wheel A, in connection with wheel B and ring I.

The nature of my invention consists in constructing the wheel A in the annexed drawings in such a manner as to support the wheel B without clamping the cogs in wheels A and B.

To enable others skilled in the art to make and use my invention, I will proceed to describe its construction and operation.

I construct my cogged bevel wheels A with a side support No. 1, which is intended to carry the weights of the large wheel B upon a corresponding support or flange No. 2 so as to prevent the weight of wheel B from resting upon the cogs of wheels A. The wheels A revolve upon axes C and at the same time make the revolution of the wheel B, the axis C is fixed permanently to the center post D and supported with braces Nos. 2, 3, 4. The arms E are also permanent to the center post D to which are attached the animals used for propelling it. The power is taken from the wheel B by the cog wheel F, as represented in the annexed drawings. The wheel F, is attached to the same shaft G with the belt wheel H. This shaft G is suspended with hangers in any of the usual ways. The belt runs upon the wheel H and from thence to the point required. By increasing or diminishing the diameter of wheel I, I am enabled to impart a corresponding degree of speed to the wheel B thus giving a velocity varying according to the size of the wheel I from 3 to 10 or more revolutions as desired.

What I claim as my invention and desire to secure by Letters Patent is—

The combination of the cogged wheel A having the supporting flange No. 1, and the wheel B with corresponding cogs and bearing revolving upon the supporting ring I, the whole constructed and operating substantially as and for the purpose above set forth.

FERDINAND M. SOFGE.

Witnesses:
J. D. CLARK,
P. P. PITCHLYNN.